Patented Dec. 10, 1940

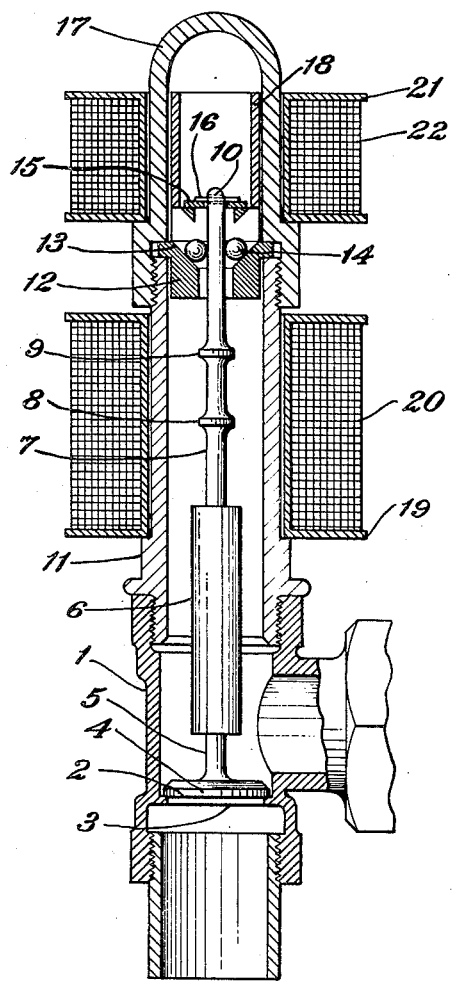
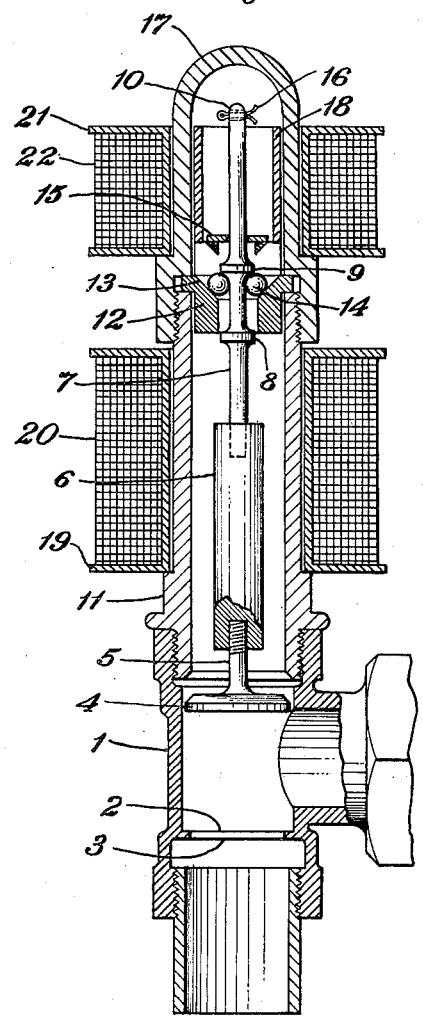

2,224,147

UNITED STATES PATENT OFFICE 2,224,147

VALVE

Carl H. Ehlers, Upper Darby, Pa.

Application February 2, 1939, Serial No. 254,297

3 Claims. (Cl. 137—139)

The present invention relates to improvements in valves of the electro-magnetic type, and more particularly to such valves as have no packed joints or glands, and which require only a momentary flow of current to effect either opening or closing thereof.

Advantages of valves within the scope of my invention and how disadvantages of electro-magnetic valves heretofore proposed have been overcome, will be apparent from the following description of a preferred and illustrative embodiment of my invention described below and shown in the accompanying drawing, wherein:

Fig. 1 is a view in section taken vertically through the valve assembly; and

Fig. 2 is a similar view with the parts of the valve assembly in different relative position.

Referring to the drawing in which like reference numerals denote the same parts in each of the figures, the valve assembly is comprised of a casing 1 having a valve seat 2 about a port or aperture 3. A valve head 4 provided with a stem 5, is adapted to engage with the seat 2. The valve head and stem are of non-magnetic material, such as brass, Bakelite or other suitable composition, and the stem 5 engages by means of threads with a core 6 of magnetic metal, such as soft iron.

With the upper end of the valve casing 1, there engages by means of threads a stem casing 11 of non-magnetic material; and partly within and at the upper end of said stem casing there is provided a ball guide 12 of non-magnetic material. The ball guide is open at either end so that the rod 7 and its projections 8 and 9 may freely pass upwardly therethrough and also downwardly therethrough except when obstructed in the manner hereinbelow disclosed. The ball guide 12 is also provided with apertures 13 which are angularly disposed with respect to the vertical axis of the valve, and within each aperture 13, there is provided a steel ball 14 of such size that it can freely roll therewithin.

The locking rod 7 is provided with a guide washer 15 through which the upper portion of said rod may freely pass, and a cotter pin 16 is placed in the small hole 10 provided adjacent the upper end of said rod. The washer 15 normally rests upon the upper face of the ball guide 12.

A cap member 17 of non-magnetic material engages by means of threads with the upper end of the stem casing 11 and serves to enclose the upper part of locking rod 7 and also to enclose a sleeve 18 of magnetic metal arranged in close proximity to the inner wall of said cap member, with its lower end resting upon the ball guide 12. The cap member also serves to hold ball guide 12 upon and partly within the stem casing 11.

About the stem casing 11, there is disposed a spool 19, provided with a coil of wire 20, which when energized will act upon magnetic core 6 to draw it upwardly within said stem casing. Also, disposed about cap member 17, there is provided a second spool 21, provided with a coil of wire 22 which when energized will produce a magnetic effect in or upon sleeve 18, thus causing it to attract and pull steel balls 14 upwardly and at an angle through the angularly disposed apertures 13 in ball guide 12.

Assuming the valve to be closed, the assembled parts are in the relation with respect to each other as indicated in Fig. 1 of the drawing. Now assume that it is desired that the valve be opened, coil 20 is momentarily energized, whereupon the core 6 and parts attached thereto, move upwardly, the steel balls 14 riding over the upper surface of projection 9 on locking rod 7 and coming to rest between the ball guide 12 and the lower surface of projection 9, thus in effect forming a latch which prevents the core 6 and valve head 4 from dropping downwardly with incident closing of the valve port 3. The relation of the assembled parts under the circumstances last described is shown in Fig. 2.

Now suppose that the valve is to be changed from the open position to the closed position. This is effected by momentarily energizing coil 22 which causes sleeve 18 to magnetically attract steel balls 14 drawing them upwardly through the angularly disposed apertures 13, whereupon the locking stem 7 is released and with the core 6, valve stem 5 and valve head 4, drop downwardly until the valve comes to rest upon the valve seat about aperture or port 3, thus closing said aperture.

It will be understood that the above described embodiment of my invention is for illustrative purposes and is not to be construed as limiting my invention to a specific structure, such as has been shown and described. It is apparent that numerous modifications may be made, all within the scope of my invention. For example, the use of springs may be resorted to instead of depending upon gravity to effect closing of the valve, the mechanism for opening and closing the valve may be applied to butterfly valves, gate valves, or types of valves other than the type specifically illustrated in the accompanying drawing. Furthermore, the relation of the valve and its seat may be reversed so that movement of the valve stem upwardly will effect closing of the valve port.

I have found that it is particularly advantageous to employ magnetic metal cores of square cross section within a housing or casing of circular cross section, in types of electro-magnetic valves in which fluid passing through the valve may come in contact with the core and its surrounding casing, since the space thus provided between the square core and the inner wall of the circular casing permits particles of rust or other sediment to drop from between the core and casing into the stream of fluid passing through the valve when it is open, thus eliminating the possibility of impeding or hindering the free passage of the core in either direction within the casing.

What I claim is:

1. In combination with a device to be actuated, an electromagnet associated with said device and adapted to actuate same, said electromagnet embodying a coil, a core vertically arranged and loosely mounted in said coil, latching means associated with said core, said core and latching means being adapted to be moved to one position when said coil is energized and, unless obstructed, to move to another position when said coil is deenergized, a second electromagnet associated with said device, means freely movable in all directions to limited extent adapted to be pulled out of the path of movement of the core and latching means first mentioned when said second electromagnet is energized, and to drop into the path of movement of said core and latching means and restrain the movement thereof when the second electromagnet is deenergized.

2. In a device of the class described, an electromagnet embodying a coil, a core loosely mounted in said coil and adapted to be drawn into said coil when the latter is energized, a second electromagnet embodying a second coil and a fixed hollow core, means rigidly attached to the first mentioned core for holding said core within its coil, means cooperating with the means first mentioned to hold the first core within its coil when both coils are deenergized, the means last mentioned being freely movable in all directions to limited extent and adapted to disengage with the first mentioned means, as a result of attraction of said freely movable means by the fixed core within the second coil aforesaid when said second coil is energized.

3. In combination, a valve casing having a port, and an extended portion in fluid tight relation with said casing, a valve member within said casing adapted to engage with and close said port, a valve stem extending from said valve member into said extended portion of said casing, said valve stem having a core of magnetic metal affixed thereto and a projection upon an extended portion thereof, a guide member within the extended portion of said casing having an aperture therethrough through which the extended portion of said valve stem and said projection may pass, angularly disposed apertures within said guide member, freely movable steel balls within said angularly disposed apertures, a member of magnetizable metal arranged above said guide member at the upper end of said angularly disposed apertures, a magnetic coil arranged externally of the extended portion of said valve casing adjacent the part thereof within which said core is disposed, and a second magnetic coil arranged externally of the extended portion of said casing adjacent the part thereof within which said member of magnetizable metal is disposed.

CARL H. EHLERS.